United States Patent

Low et al.

[15] 3,700,334
[45] Oct. 24, 1972

[54] INTERFEROMETER-POLARIMETER

[72] Inventors: George M. Low, Deputy Administrator of the National Aeronautics and Space Administration, with respect to an invention of; Alain L. Fymat, San Marino, Calif.; Krishna D. Abhyankar, Hyderabad, India

[22] Filed: Nov. 13, 1970

[21] Appl. No.: 89,211

[52] U.S. Cl. .................................. 356/106, 356/114
[51] Int. Cl. .......................... G01b 9/02, G01n 21/40
[58] Field of Search ............................... 356/106, 113

[56] References Cited

UNITED STATES PATENTS

| | | | |
|---|---|---|---|
| 3,601,490 | 8/1971 | Erickson | 356/106 |
| 3,463,924 | 8/1969 | Culshaw et al. | 356/106 X |

*Primary Examiner*—Ronald L. Wibert
*Assistant Examiner*—Conrad Clark
*Attorney*—Monte F. Mott, Paul F. McCaul and John R. Manning

[57] ABSTRACT

A system for measuring the intensity and state of polarization of a radiation field as well as obtaining the spectral variations of these quantities with a wide range of spectral resolution, i.e., from low to extremely high resolution values, is disclosed. The system generally includes any standard or conventional two-beam interferometer which is modified by the inclusion of a polarizer in each of the beams and an analyzer positioned in front of a sensor or recording device. More specifically, the system employs a beam splitter which serves to divide light from a selected light source into a pair of individual light beams. Each of the light beams is directed through a polarizer. The polarizers are positioned to have preselected planes of polarization with respect to each other and with respect to the plane of polarization of the analyzer. The polarized light beams are applied to a variable optical retarder which serves to selectively modify the relative optical path lengths of the light beams. An optical mixer may be employed to recombine the two light beams. The recombined light beams are projected through an analyzer, such as a linear polarizer, to a sensor or recording device.

7 Claims, 3 Drawing Figures

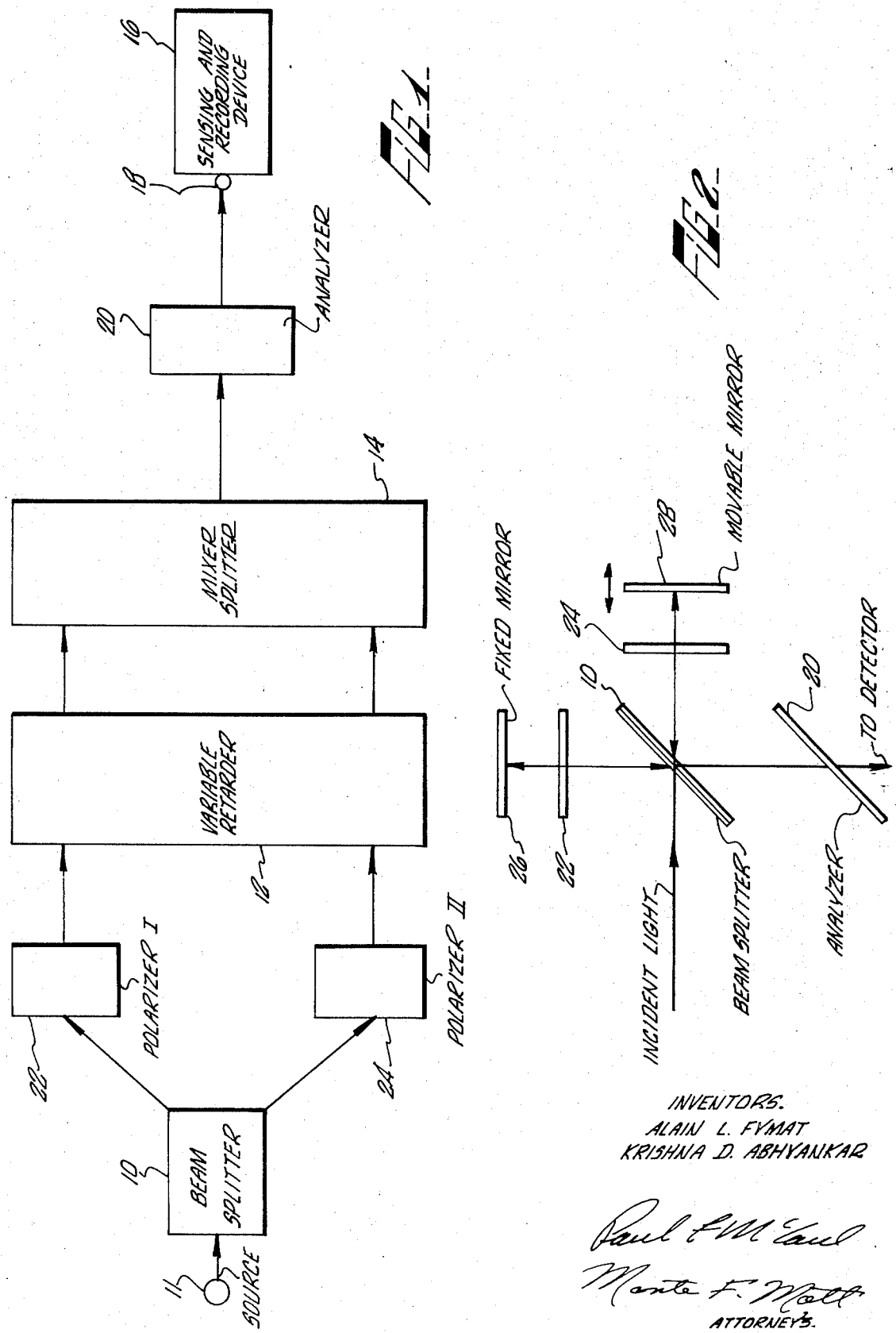

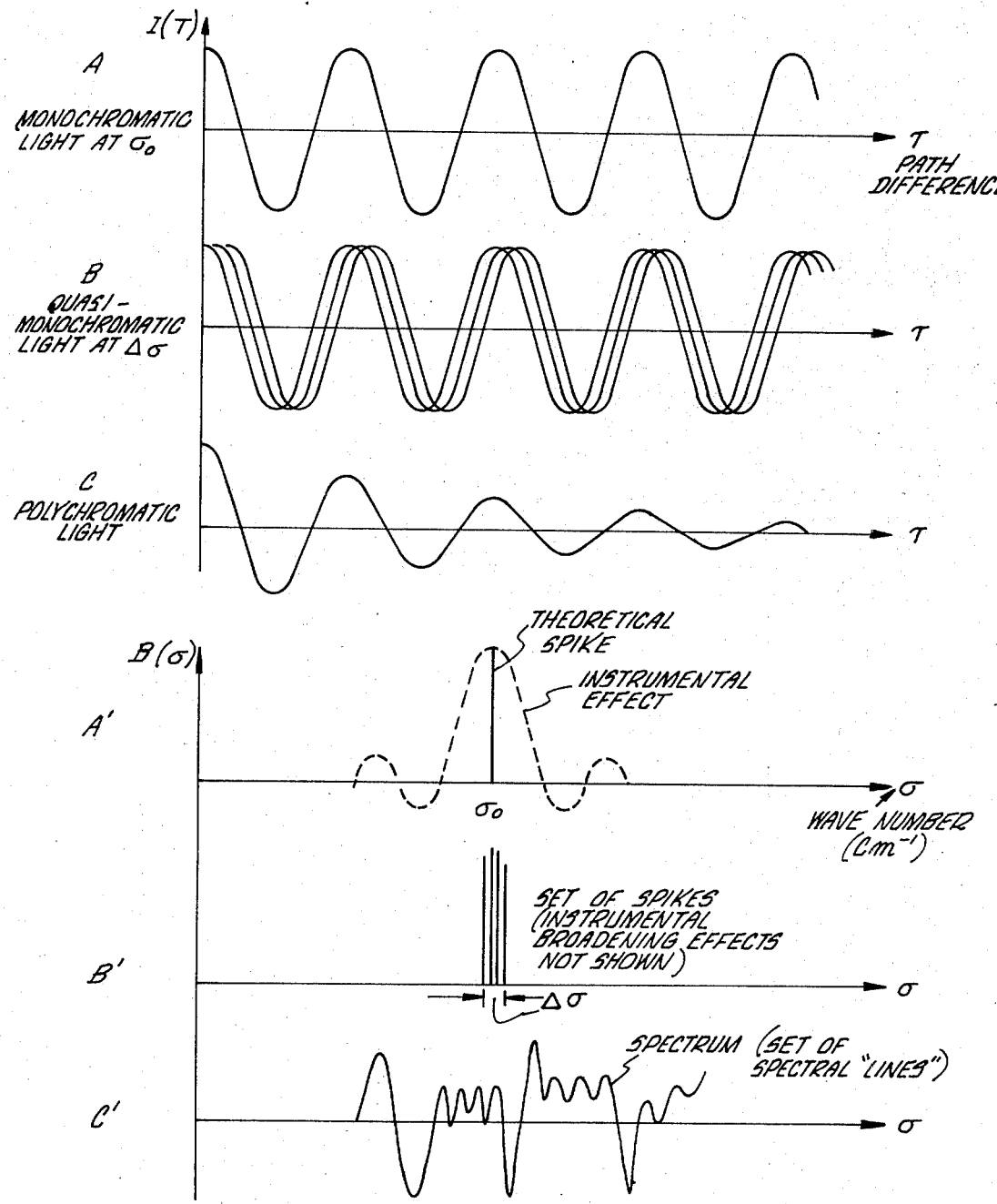

INTERFEROMETER-POLARIMETER

ORIGIN OF THE INVENTION

The invention described herein was made in the performance of work under a NASA contract and is subject to the provisions of Section 305 of the National Aeronautics and Space Act of 1958, Public Law 85-568 (72Stat. 435; 42 USC 2457).

BACKGROUND OF THE INVENTION

1. Field of the Invention

This invention generally relates to devices for performing an analysis of optical radiation. More particularly, the present invention concerns an optical arrangement which may be employed to measure both the intensity and state of polarization of optical radiation as well as to perform a spectrum analysis of these quantities with any desired spectral resolution.

2. Description of the Prior Art

It is well known that scattering influences, in a fundamental way, the nature of the radiation field which emerges from a planetary atmosphere. The effects of this scattering depends on both the relative importance or amount of scattering and absorption in attenuating an incident light beam and on the phase matrix for the scattering particles. Conventionally, the phase matrix of a scattering particle defines how that particle will directionally redistribute optical radiation incident on the particle. Since these two characteristics vary with frequency, the spectral variation of the observed radiation, particularly the line profiles, can give considerable information about the atmospheric structure. One relevant factor in such considerations is the variation of polarization across the line; even a simple measurement of the difference between the integrated polarization within the line and the polarization of the surrounding continuum is important in this respect.

In addition to the study of planetary spectra, determining concurrently both the intensity and state of polarization of light has direct applications to other astronomical problems such as measuring the polarization of emission lines in planetary nebulae, in the airglow spectrum, and in chemical analyses of constituents.

Accordingly, there is a continuing need in the field of optical research for experimental techniques and apparatus that are useful in measuring both the intensity and state of polarization of light with any desired degree of spectral resolution, from low to extremely high. This is particularly true when it comes to quantitatively determining the intensity and state of polarization of a light beam by obtaining the relevant "Stokes parameters" of light which define intensity (I), degree of polarization (Q), orientation of the plane of polarization (U), and ellipticity of the polarization ellipse (V).

Conventionally, the Stokes parameters can be obtained by making four suitably chosen measurements. For example, total intensity (I) may be obtained by using 0° and 90° polarizers in conjunction with an analyzer. Alternatively, it may also be obtained by Fourier transform spectroscopy using an ordinary unmodified Michelson interferometer. Measuring degree of polarization (Q) also requires the use of 0° and 90° polarizers in conjunction with an analyzer. The remaining two parameters "U" and "V" can be obtained by using a 45° polarizer and a 90° phase shifting device, such as a quarter wave plate, in conjunction with an analyzer.

Typically, all four measurements are made by employing a fixed retarder, three polarizers, at 0°, 45° and 90°, and an analyzer is series optical relationship. However, except for ordinary Fourier transform spectrometry which considers only the total intensity (I), these conventional techniques do not provide the degree of resolution necessary for analysis of the spectra of, for example, relatively unknown gaseous, liquid, or solid media, or media containing elements in some or all of these phases.

OBJECTS AND SUMMARY OF THE INVENTION

Accordingly, it is an object of the present invention to provide an optical arrangement that enables both the intensity and state of polarization of optical radiation to be measured with any desired degree of resolution.

It is another object of the present invention to provide an optical arrangement that enables the spectral distributions of both state of polarization as well as energy to be measured concurrently.

It is a further object of the present invention to provide an optical system for obtaining information about the composition, structure and optical properties of an absorbing, scattering or emitting medium.

It is a yet further object of the present invention to provide an interferometer-polarimeter that may be easily employed to obtain from low to extremely high resolution data for very weak emitting sources.

Briefly described, the present invention involves a technique and apparatus that is useful for Fourier transform spectroscopy as well as for determining the state of polarization of optical radiation and its spectral variation to thereby provide the synergistic advantages of having an interferometer as well as a polarimeter. For example, the combined capability of the invention provides the advantage of efficient utilization of light allowing very weak sources to be studied from both standpoints. Additionally, the high degree of resolution allows planetary media and emitting sources, heretofore unable to be studied, to be analyzed.

More particularly, the subject interferometer arrangement includes a standard two-beam interferometer which plays the role of a continuous phase retarder and is equipped with matched, and particularly oriented, polarizers in each beam. An analyzer is situated at the recombined focus point of the interferometer. A sensing or recording device is positioned to record interferograms. The interferometer may include a beam splitter for providing the pair of light beams, and an optical retarder for allowing the relative optical path lengths of the two light beams to be varied. A beam recombiner in the form of a functionally reversed beam splitter may be used to recombine the two light beams. This recombination may also be performed directly as in a Young's slit device.

The intensity and state of polarization of optical radiation are measured by obtaining three interferograms. For each interferogram, the polarizers are positioned to have selected planes of polarization with respect to each other and with respect to the analyzer. The resulting data is simply employed in the calculation of the Stokes parameters.

The features that characterize the novelty of the present invention are set forth with particularity in the appended claims. Both the organization and manner of operation of the invention, as well as other objects and the attendant advantages thereof, may be best understood by reference to the following detailed description taken in conjunction with the accompanying drawings wherein like reference symbols designate like parts throughout the figures thereof.

BRIEF DESCRIPTION OF THE DRAWINGS

FIG. 1 is a schematic block diagram illustrating a preferred embodiment of the present invention.

FIG. 2 is a schematic diagram illustrating a Michelson interferometer that has been modified in accordance with the present invention.

FIG. 3 is a graphic diagram illustrating a number of different interferograms along with corresponding energy spectrums or Fourier transforms.

DESCRIPTION OF THE PREFERRED EMBODIMENT

An understanding of the theoretical concepts associated with the present invention is a prerequisite to an appreciation of the function of an interferometer-polarimeter, in accordance with the invention. As such, the following discussion includes a mathematical analysis which serves to describe the unusual function of the present invention and the results produced therewith.

The basic representation of the state of polarization of a quasi-monochromatic field, given by the column matrix $$\bar{E} = \begin{pmatrix} E_x \\ E_y \end{pmatrix}$$

is in terms of the time averages (denoted by angular brackets) of products of the complex field components $<E_i E^*_j> = J_{ij}$, where $i = x, y$ and $j = x, y$ and where the asterisk(*) designates the complex conjugate of the term $E_j$. It has been established that these complex field components also define a coherency matrix $$\underset{\sim}{J} = <\bar{E} \times \bar{E}^\dagger> = \begin{pmatrix} J_{xx} J_{xy} \\ J_{yx} J_{yy} \end{pmatrix} \quad (1)$$

where $\bar{E}^\dagger$ denotes the Hermitian conjugate of $\bar{E}$ and the cross represents the Kronecker product. The elements of the coherency matrix $\underline{J}$ are related to the Stokes parameters of the radiation field as follows:

$I = J_{xx} + J_{yy} = \text{Trace } \underline{J}$
$Q = J_{xx} - J_{yy}$
$U = J_{xy} + J_{yx}$
$V = -i(J_{xy} - J_{yx})$    2.

It may be noted that $J_{xx}$ and $J_{yy}$ are real quantities whereas $J_{xy}$ and $J_{yx}$ are complex conjugates of each other. In that $J_{xy}$ may be conveniently expressed in terms of real quantities, i.e., $J_{xy} = |J_{xy}| \exp(i\beta_{xy})$, all of the Stokes parameters can be considered as real quantities and have the dimensions of intensity.

The effect of any optical device on an electric field can be represented by a 2×2 Jones' matrix $\underline{K}$ such that $\bar{E}' = \underline{K}\bar{E}.$    3

The coherency matrix, $\underline{J}'$, of the resultant field can be obtained from $\bar{E}'$ by using Eq. (1). The emergent intensity given by the trace Tr $\underline{J}'$ of the matrix $\underline{J}'$ is a function of the Stokes parameters of the incident field. For example, if light is passed through a compensator, which retards the phase of the y-component with respect to that of the x-component by an angle $\epsilon$, and then passed through a linear polarizer making an angle $\theta$ with the positive x-direction, the emergent intensity will be given by the interference equation:

$I(\theta,\epsilon) = J_{xx} \cos^2\theta + J_{yy} \sin^2\theta + 2|J_{xy}| \cos\theta \sin\theta \cos(\beta_{xy} - \epsilon).$    4

From this equation (4) it is readily apparent that four independent measurements of $I(\theta,\epsilon)$ for various combinations of $\theta$ and $\epsilon$ will be sufficient to determine the four Stokes parameters (I, Q, U and V).

Referring now to FIG. 1 of the drawings, the present invention includes a two-beam interferometer comprising a beam splitter 10, a variable retarder 12, and a beam recombiner 14. An appropriate sensing or recording device 16 may be situated at the focal point 18 to sense or record emergent light. An analyzer 20, which may be a linear polarizer, is situated intermediate the beam recombiner 14 and the recorder 16. A pair of matched polarizers 22 and 24 are respectively situated in the paths of the two light beams produced by the beam splitter 10.

The beam splitter 10, as well as the beam recombiner 14 (when a functionally reversed beam splitter is used therefor), must be suitably chosen to accommodate the region of the electromagnetic spectrum in which a particular experiment is being conducted. For example, beam splitters have been developed to accommodate different portions of the infrared region. In the intermediate infrared region (1.5 $\mu$ to 20 $\mu$), where Fourier spectroscopy possibly has its greatest advantages, a typical beam splitter may consist, for example, of a thin film coating, such as germanium, which is structurally sandwiched between a transparent substrate and compensating plate. Usually the substrate and compensator are made of a low refractive index (n) material such as sodium chloride (n = 1.5).

The variable retarder 12 may simply include any well known combination of elements that serve to vary the optical path length of one of the two light beams produced by the beam splitter 10 such that the difference between the respective optical path lengths can be varied. In a Michelson interferometer, as shown in FIG. 2, the variable retarder 12 comprises a pair of mirrors, of which one is fixed and the other is movable along the path through which incident light is projected.

The polarizers 22 and 24 serve to suitably polarize the light beams projected therethrough. Although the polarizers 22 and 24 may be arbitrarily chosen, it is preferable for the sake of simplicity that both polarizers either be linear or circular. Generally considered, circular polarizers are of limited interest because it is, as a practical matter, difficult to construct circular polarizers which are perfect over a large range of wavenumbers.

Each of the polarizers 22 and 24 are appropriately mounted to allow the respective planes of polarization to be varied with respect to each other. This simply requires that the polarizers each be adapted to be rotated about the path along which a light beam is projected.

The analyzer 20 may also be a linear polarizer, the plane of polarization of which is set along a predetermined axis as is hereinafter described.

The present invention may incorporate a Michelson interferometer, a Young interferometer, or any other two-beam interferometer. FIG. 2 illustrates the fashion in which a Michelson interferometer may be used. A pair of mirrors 26 and 28, of which the mirror 26 is fixed and the mirror 28 is movable, are employed to produce the necessary variations of the relative path lengths of the two light beams produced by the beam splitter 10. The polarizers 22 and 24 are respectively interposed between the beam splitter 10 and the mirrors 26 and 28.

Referring once again to FIG. 1, the radiation from the source 11 may be expressed as $\bar{E}_\sigma$ where $\sigma$ designates the wavenumber of the radiation. The two beams produced by the beam splitter 10 may be expressed as complex amplitude vectors $\underline{S}_1 \bar{E}_\sigma$ and $\underline{S}_2 \bar{E}_\sigma$ where $\underline{S}_1$ and $\underline{S}_2$ are the Jones matrices representing the action of the beam splitter 10. The latter include both the fractional transmission, or reflection, and the polarization introduced into the beams. (For an ideal Michelson interferometer $\underline{S}_1 = \underline{S}_2 = 1/\sqrt{2}\,\underline{1}$, where $\underline{1}$ is the unit matrix). The light beams 1 and 2 are then passed through the polarizers 22 and 24, respectively. Letting $\underline{Z}_1$ and $\underline{Z}_2$ represent the Jones matrices of the two polarizers 22 and 24, the amplitudes of the light beams emerging from the polarizers may be expressed a $\underline{Z}_1 \underline{S}_1 \bar{E}_\sigma$ and $\underline{Z}_2 \underline{S}_2 \bar{E}_\sigma$.

The interferometer introduces a relative retardation between the beams 1 and 2 which retardation may be represented by the Jones matrices $\underline{R}_1$ and $\underline{R}_2$. If the relative retardation in phase is $\delta = 2\pi\sigma\tau$, where $\tau$ equals path difference, one way of expressing $\underline{R}_1$ and $\underline{R}_2$ would be $$\underline{R}_1 = e^{-i\epsilon/2}\,\underline{1}, \quad \underline{R}_2 = e^{i\epsilon/2}\,\underline{1}. \quad (5)$$

After retardation, the two light beams 1 and 2 have the amplitudes $\underline{R}_1 \underline{Z}_1 \underline{S}_1 \bar{E}_\sigma$ and $\underline{R}_2 \underline{Z}_2 \underline{S}_2 \bar{E}_\sigma$. The light beams are then recombined, either directly (as in Young's experiment) or after a second passage through the splitter (as in Michelson's interferometer), by the beam recombiner 14. The effect of the recombiner 14 can be represented by the Jones matrices $\underline{M}_1$ and $\underline{M}_2$ for the two beams, respectively. Hence, the combined emergent amplitude will be $(\underline{M}_1 \underline{R}_1 \underline{Z}_1 \underline{S}_1 + \underline{M}_2 \underline{R}_2 \underline{Z}_2 \underline{S}_2)\bar{E}_\sigma$, or $(\underline{R}_1 \underline{M}_1 \underline{Z}_1 \underline{S}_1 + \underline{R}_2 \underline{M}_2 \underline{Z}_2 \underline{S}_2)\bar{E}_\sigma$ due to Eq. (5).

In the radio region, it is possible to deal directly with this combined amplitude in the form of an output voltage of the mixer element of the circuit. However, in the optical region, it is necessary to employ an analyzer 20 in the form of a linear polarizer. Letting $\underline{Z}_3$ represent the Jones matrix for the analyzer 20, the amplitude of the combined light beams emerging from the analyzer 20 will be $\bar{E}(\underline{Z}_3) = \underline{Z}_3(\underline{R}_1 \underline{M}_1 \underline{Z}_1 \underline{S}_1 + \underline{R}_2 \underline{M}_2 \underline{Z}_2 \underline{S}_2)\bar{E}_\sigma$ which gives the coherency matrix $\underline{J}(\delta)$ according to Eq. (1). The contribution to intensity for a fixed path difference $\tau$, from radiation in the wavenumber interval $d\sigma$ will be $I_\tau(\sigma)\,d\sigma = Tr\,\underline{J}(\delta)d\tau$. The total intensity is given by $$I(\tau) = \int_0^\infty I_\tau(\sigma)\,d\sigma. \quad (6)$$

wherein the variable part of $I(\tau)$ is known as the interferogram. Although both the variable and constant parts of $I(\tau)$ contain information about the Stokes parameters of the original radiation, only the interferogram can be used for this purpose in the method of Fourier spectroscopy.

Referring now to FIG. 3, exemplary interferograms and corresponding Fourier transforms are illustrated. As shown by Waveform A, the interferogram for monochromatic light would appear as a pure sine wave when intensity $I(\tau)$ is plotted as a function of path difference $\tau$. The corresponding energy spectrum appears as a spike as shown by Waveform A'. The interferogram for quasi-monochromatic light would appear as a blurred sine wave as shown by Waveform B. The corresponding energy spectrum for quasi-monochromatic light generally appears as a series of spikes as shown by Waveform B'. As shown by Waveform C, the interferogram for polychromatic light appears as an exponentially attenuated sinusoidal wave when $I(\tau)$ is plotted as a function of path difference, $\tau$. The corresponding energy spectrum is shown by Waveform C'.

In order to obtain the Stokes parameters of the incident radiation from the interferograms, it is important to first examine how they enter into the observed interferograms.

Letting $\underline{P}_j = \underline{M}_j \underline{Z}_j \underline{S}_j$, $(j=1, 2)$, $\underline{P}_3 = \underline{Z}_3$, writing $$\underline{P}_i(\sigma) = \begin{pmatrix} P_{i1} & P_{i2} \\ P_{i3} & P_{i4} \end{pmatrix}_\sigma, \quad (i=1, 2, 3) \quad (7)$$

and making use of Eq. (5), we get the emergent amplitude vector $$\bar{E}(P_3) = \begin{pmatrix} P_{31} & P_{32} \\ P_{33} & P_{34} \end{pmatrix}\left[\begin{pmatrix} P_{11} & P_{12} \\ P_{13} & P_{14} \end{pmatrix} e^{-i\delta/2} + \begin{pmatrix} P_{21} & P_{22} \\ P_{23} & P_{24} \end{pmatrix} e^{i\delta/2}\right]\begin{pmatrix} E_x \\ E_y \end{pmatrix}$$

It can be written as $$\bar{E}(P_3) = \begin{pmatrix} \left(\alpha_1 \cos\frac{\delta}{2} - i\beta_1 \sin\frac{\delta}{2}\right) E_x + \left(\alpha_2 \cos\frac{\delta}{2} - i\beta_2 \sin\frac{\delta}{2}\right) E_y \\ \left(\alpha_3 \cos\frac{\delta}{2} - i\beta_3 \sin\frac{\delta}{2}\right) E_x + \left(\alpha_4 \cos\frac{\delta}{2} - i\beta_4 \sin\frac{\delta}{2}\right) E_y \end{pmatrix} \quad (8)$$

where the $\alpha$'s and $\beta$'s are functions of $\sigma$ through the $P_{ij}$'s. Then computing $\underline{J}(\delta)$ and taking its trace, we obtain $$I_\tau(\sigma) = a_1(\sigma) + a_2(\sigma)\cos\delta + a_3(\sigma)\sin\delta, \quad 9$$

where (after using Eq. (2))

$$a_i(\sigma) = p_i(\sigma) I(\sigma) + q_i(\sigma) Q(\sigma) + r_i(\sigma) U(\sigma) + s_i(\sigma) V(\sigma),$$
$$(i=1, 2, 3), \quad 10$$

and $p_i$, $q_i$, $r_i$, $s_i$ are known real functions of the $p_{ij}$'s through the $\alpha$'s and $\beta$'s. The observed intensity will be $d(\sigma) I_r(\sigma)$, where $d(\sigma)$ is a factor representing the instrumental sensitivity.

Introducing the auxiliary quantities $\rho(\sigma)$ and $\psi(\sigma)$ by the equations $$a_2(\sigma) = \rho(\sigma) \cos \psi(\sigma) \qquad (5)$$

$$a_3(\sigma) = \rho(\sigma) \sin \psi(\sigma) \qquad (11)$$

Eq. (9) can also be written in the form $$I_r(\sigma) = d(\sigma)[a_1(\sigma) + \rho(\sigma) \cos \{\delta - \psi(\sigma)\}]. \qquad (12)$$

At this point it should be noted that the effect of the polarizers has been to introduce the argument function $$\psi(\sigma) = \tan^{-1}\left[\frac{a_3(\sigma)}{a_2(\sigma)}\right]$$

in the cosine term at the right hand side of this equation, and to weight the constant and variable parts of the intensity with different functions of $\sigma$.

In the case of quasi-monochromatic light, for example, the spectrum consists of an extremely narrow band centered at wavenumber $\sigma_0$. Hence Eq. (12) itself gives the observed intensity with $\sigma = \sigma_0$ and $\delta = 2\pi\sigma_0\tau$. It is a sinusoidal function of $\tau$ from which the quantities $a_i(\sigma_0)$ can be derived in a straightforward manner by using Eq. (11). Then Eq. (10) provides three linear relations between the four unknown Stokes parameters. Hence, one intensity curve alone is not sufficient for deriving all of these parameters. But, if one more intensity curve with an independent setting of the polarizers 22 and 24, and the analyzer 20, is obtained, three additional relations will be obtained. Combining the two data, we have six equations which are more than sufficient to determine the four Stokes parameters.

Considering the use of Fourier spectroscopy for polychromatic light, total intensity is obtained by integrating $I_r(\sigma)$ over all wavenumbers. Thus, substituting Eq. (12) in Eq. (6), we get $$I(\tau) = \int_0^\infty d(\sigma)\{a_1(\sigma) + \rho(\sigma) \cos [2\pi\sigma\tau - \psi(\sigma)]\}d\sigma \qquad (13)$$

and the interferogram is given by $$\text{Var.}\{I(\tau)\} = \int_0^\infty d(\sigma)\rho(\sigma) \cos [2\pi\sigma\tau - \psi(\sigma)]d\sigma \qquad (14)$$

This expression shows that, owing to the use of the polarizers 22 and 24, the interferogram obtained with the present invention is not a symmetrical function of $\tau$. Hence, the spectral distribution of the incident radiation is not the Fourier cosine transform of the interferogram. We must therefore resort to the full (exponential) transform for deriving $\rho(\sigma)$ and $\psi(\sigma)$, which in turn would give the four Stokes parameters of the incident radiation.

If for negative wavenumbers we assume that we have $$d(-\sigma) = d(\sigma), \rho(-\sigma) = \rho(\sigma), \psi(-\sigma) = -\psi(\sigma) \qquad (15)$$

then Eq. (14) becomes:

$$\text{Var.}\{I(\tau)\} = \frac{1}{2}\int_{-\infty}^\infty d(\sigma)p(\sigma) \exp[-i\psi(\sigma)]e^{-i2\pi\sigma\tau}d\sigma. \qquad (16)$$

Eq. (16) is true only for an ideal interferometer. In practice, however, one has to take into account the following imperfections of the system:

i. The finite extent $(\tau_1, \tau_2)$ of the interferogram; this is indicated by a positive transfer function $T(\tau)$ in front of the integral on the right hand side of Eq. (14). This function is made to vanish outside the interval $(\tau_1, \tau_2)$.

ii. The zero point of $\tau$ may vary with $\sigma$ which introduces a further asymmetry in the interferogram; this is taken into account by introducing a phase term $\{-\phi(\sigma)\}$ in the argument of the cosine factor. Amplitude terms which depend on $\sigma$ only can be included in $d(\sigma)$.

iii. On account of (ii), the values of $\tau_1$ and $\tau_2$ may vary with $\sigma$, although their difference $(\tau_2 - \tau_1)$ may remain constant, thus causing changes in the geometrical parameters of the interferometer. This interaction gives rise to another positive amplitude factor $B(\sigma\tau)$ and an additional phase term $\gamma(\sigma\tau)$. Hence Eq. (14) becomes $$\text{Var}\{I(\tau)\} = T(\tau)\int_0^\infty d(\sigma)p(\sigma)B(\sigma\tau) \cos \{2\pi\sigma\tau - \psi(\sigma) - \phi(\sigma) + \gamma(\sigma\tau)\}d\sigma. \qquad (17)$$

This is the correct expression for any recorded interferogram. Now, in addition to Eq. (15), if for negative wavenumbers, we also assume that we can write $$B(-\sigma\tau) = B(\sigma\tau),$$

$$\phi(-\sigma) = -\phi(\sigma), \delta(-\sigma\tau) = -\delta(\sigma\tau), \qquad (18)$$

then, the interferogram could be expressed by $$\text{Var}\{I(\tau)\} = \frac{1}{2}T(\tau)\int_{-\infty}^\infty d(\sigma)\rho(\sigma)S^*(\sigma\tau) \exp\{i[\psi(\sigma) + \phi(\sigma)]\}e^{-i2\pi\sigma\tau}d\sigma \qquad (19)$$

where we have written $$S(\sigma\tau) = B(\sigma\tau)\exp[i \delta(\sigma\tau)] = S^*(-\sigma\tau). \qquad (20)$$

If the size of the source is sufficiently small, $S^*(\sigma\tau)$ can be replaced by $S^*(\sigma_0\tau)$, where $\sigma_0$ is the mean wavenumber of the passband. Then, Eq. (19) becomes $$\frac{2 \text{Var}[I(\tau)]}{T(\tau)S^*(\sigma_0\tau)} = \int_{-\infty}^\infty d(\sigma)\rho(\sigma) \exp\{i[\psi(\sigma) + \phi(\sigma)]\}e^{-i2\pi\sigma\tau}d\sigma \qquad (21)$$

From Eq. (21) we see that $2\text{Var}[I(\tau)]/T(\tau) S^*(\sigma_0\tau)$ and $(d(\sigma) \rho(\sigma) \times \exp\{i[\psi(\sigma) + \phi(\sigma)]\})$ form a Fourier pair. Hence the full (exponential) transform of the interferogram yields the latter function. In Eq. (21) the function $T(\tau)$ represents an amplitude factor, for the interferogram is real. It is the Fourier transform of the scanning function. If the latter is apodized, then $Y(\tau)$ is a suitably tapered function which vanishes at the ends of the path difference interval $(\tau_1, \tau_2)$ in a smooth way. The phase term $\phi(\sigma)$ represents an important source of error for it contributes, along with $\psi(\sigma)$, to the destruction of the symmetry of the interferogram. The term $S(\sigma\tau)$, known as the source function, includes both amplitude and phase effects. Now, since $T(\tau)$, $d(\sigma)$, and $S^*\sigma_0\tau)$ are known functions, one can derive $\rho(\sigma)$ and $[\psi(\sigma) + \phi(\sigma)]$. In order to determine the phase error $\phi(\sigma)$, we must have one interferogram for which $\psi(\sigma)$ is known. Here it is assumed that the interferometer is sufficiently stable during the time of one set of measurements so that $\phi(\sigma)$ is identical for all interferograms. Of particular interest are the cases where $\psi(\sigma) \equiv 0$ which are later discussed. For them $\phi(\sigma)$ can be obtained by well known methods. However, this determination of $\phi(\sigma)$ is arbitrary to within an additive term $2\pi\sigma\tau$ which depends on the choice of the origin of the interferogram. If the same origin is taken for all interferograms, this additional term will be identical for all of them.

Now, any interferogram will give us the two functions $\rho(\sigma)$ and $\psi(\sigma) + \phi(\sigma) + 2\pi\sigma\tau$; and since $\phi(\sigma) + 2\pi94\tau$ is known, we can obtain $\psi(\sigma)$, the phase term introduced by the polarizers. The quantities $\rho(\sigma)$ and $\psi(\sigma)$, in turn, yield $a_2(\sigma)$ and $a_3(\sigma)$ according to Eq. (11). Then, from Eq. (10), we see that we have two relations in the four unknown Stokes parameters. Hence, in addition to the interferogram yielding $\phi(\sigma)$, we must have two other independent interferograms for deriving all the four Stokes parameters.

The Jones representation for a perfect linear polarizer making an angle $\theta$ with the $x$-axis is given by the real matrix $$P(\theta) = f \begin{pmatrix} \cos^2\theta & \cos\theta\sin\theta \\ \cos\theta\sin\theta & \sin^2\theta \end{pmatrix} \quad (22)$$

where $f = f_i$, ($i = 1, 2, 3$), are the transmission factors. Then, putting $\theta = \theta_i$ and carrying out the computations represented by Eqs. (8) to (10), we find that $s_1(\theta) = s_2(\theta) = p_3(\theta) = q_3(74) = r_3(\theta) = 0$ in Eq. (10) Hence, $a_3(\theta)$ is a function of $V(\theta)$ alone and $a_2(\theta)$ contains $I(\theta)$, $Q(\theta)$ and $U(\theta)$ only. In other words, $V(\theta)$ gets separated from the other three Stokes parameters. Consequently, no two settings of $P_1$ and $P_2$ are completely independent of each other. Any one setting gives an interferogram which by the Fourier spectroscopic method yields $V(\theta)$ and a linear relation between the remaining three Stokes parameters. Hence, three interferograms would be needed to get complete information about the intensity and state of polarization of the incident light.

TABLE I., hereinbelow, is provided as a summary of the equations that are pertinent to three different combinations of settings for the analyzer 20 and the polarizers 22 and 24 which could be used to obtain the three interferograms required to calculate the Stokes parameters. In TABLE I., the polarizers 22 and 24, in combination with the variable retarder 12 and the beam splitter 10, in both its direct and reversed functions, are designated by $P_1$ and $P_2$, respectively, as earlier defined in connection with Eq. (7). The analyzer 20 is designated by $P_3$. The terms $x$, $y$ and $s$ refer to planes of polarization equal to 0°, 90° and 45°, respectively.

TABLE I.—Interferometric Arrangements with Linear Polarizers

| | $A_1$ |
|---|---|
| 1. $P_1, P_2, P_3$ | $x, x, s$ |
| 2a. Amplitude $\overline{E}(P_1) = \underline{P_1}\overline{E}$ | $f_1 E_x \begin{pmatrix}1\\0\end{pmatrix}$ |
| 2b. Amplitude $\overline{E}(P_2) = \underline{P_2}\overline{E}$ | $f_2 E_x \begin{pmatrix}1\\0\end{pmatrix}$ |
| 2c. Amplitude $\overline{E}(P_3) = \underline{P_3}(\underline{R_1P_1} + \underline{R_2P_2})\overline{E}$ | $\frac{f_3}{2}(f_1 e^{-i\delta/2} + f_2 e^{i\delta/2}) E_x \begin{pmatrix}1\\1\end{pmatrix}$ |
| 3. Coherency matrix $\underline{J}(\delta)$ | $\frac{f_3^2}{4}(f_1^2 + f_2^2 + 2f_1 f_2 \cos\delta) J_{xx} \begin{pmatrix}1&1\\1&1\end{pmatrix}$ |
| 4. Intensity $= Tr \underline{J}(\delta)$ in terms of the elements of the original coherency matrix $J$. | $\frac{f_3^2}{2}(f_1^2 + f_2^2 + 2f_1 f_2 \cos\delta) J_{xx}$ |
| 5. Intensity in terms of the Stokes parameters of the incident radiation. | $\frac{f_3^2}{4}(f_1^2 + f_2^2 + 2f_1 f_2 \cos\delta)(I+Q)$ |

| | $A_2$ | $A_3$ |
|---|---|---|
| 1. | $y, y, s$ | $x, y, s$ |
| 2a. | $f_1 E_y \begin{pmatrix}0\\1\end{pmatrix}$ | $f_1 E_x \begin{pmatrix}1\\0\end{pmatrix}$ |
| 2b. | $f_2 E_y \begin{pmatrix}0\\1\end{pmatrix}$ | $f_2 E_y \begin{pmatrix}0\\1\end{pmatrix}$ |
| 2c. | $\frac{f_3}{2}(f_1 e^{-i\delta/2} + f_2 e^{i\delta/2}) E_y \begin{pmatrix}1\\1\end{pmatrix}$ | $\frac{f_3}{2}(f_1 E_x e^{-i\delta/2} + f_2 E_y e^{i\delta/2}) \begin{pmatrix}1\\1\end{pmatrix}$ |
| 3. | $\frac{f_3^2}{4}(f_1^2 + f_2^2 + 2f_1 f_2 \cos\delta) J_{yy} \begin{pmatrix}1&1\\1&1\end{pmatrix}$ | $\frac{f_3^2}{4}[f_1^2 J_{xx} + f_2^2 J_{yy} + f_1 f_2 \{(J_{xy} + J_{yx})\cos - i(J_{xy} - J_{yx})\sin\delta]] \begin{pmatrix}1&1\\1&1\end{pmatrix}$ |
| 4. | $\frac{f_3^2}{2}(f_1^2 + f_2^2 + 2f_1 f_2 \cos\delta) J_{yy}$ | $\frac{f_3^2}{2}[f_1^2 J_{xx} + f_2^2 J_{yy} + f_1 f_2 \times \{(J_{xy} + J_{yx})\cos\delta - i(J_{xy} - J_{yx})\sin\delta\}]$ or $\frac{f_3^2}{2}[f_1^2 J_{xx} + f_2^2 J_{yy} + 2f_1 f_2 |J_{xy}|\cos(\beta_{xy} - \delta)]$ |
| 5. | $\frac{f_3^2}{4}(f_1^2 + f_2^2 + 2f_1 f_2 \cos\delta)(I-Q)$ | $\frac{f_3^2}{2}[(f_1^2 + f_2^2)I + (f_1^2 - f_2^2)Q + 2f_1 f_2 (U\cos\delta + V\sin\delta)]$ |

From the foregoing discussion, it is now apparent that a two-beam interferometer, equipped to have a matching polarizer in each light beam and an analyzer in the form of a linear polarizer will produce interferograms from which the Stokes parameters may be obtained by the simple expedient of obtaining three different interferograms as explained above. The high degree of resolution capable of being obtained with the present invention now makes possible the analysis of spectra of media heretofore impossible.

What is claimed is:

1. Apparatus for producing interferograms from which the four Stokes parameters defining both intensity and the state of polarization of incident radiation, and special variations thereof, can be concurrently determined, said apparatus comprising:
   a two-beam interferometer including:
      splitter means for dividing incident radiation into two beams,
      retarder means for controllably producing phase differences between said two beams, and
      recombiner means for combining said two beams into a single recombined beam of radiation;
   first and second polarizers, each positioned in a respective one of said two beams and interposed between said splitter means and said retarder means, said first and second polarizers being adapted to have the polarization angles thereof selectively modified; and
   a third polarizer positioned in said recombined beam of radiation, said first, second and third polarizers being successively positioned to form preselected combinations of polarization angles, an interferogram being obtained for each successive combination to permit concurrent determination of said Stokes parameters.

2. The apparatus defined by claim 1 wherein said first, second and third polarizers are linear polarizers, said polarizers being adapted to be adjusted to polarize at any angle light projected therethrough.

3. The apparatus defined by claim 1 wherein said first and second polarizers are circular polarizers and said third polarizer is a linear polarizer, said first and second polarizer together forming selected combinations of right and left circular polarizers.

4. The apparatus defined by claim 1 wherein said interferometer is a Michelson interferometer.

5. The apparatus defined by claim 1 wherein said retarder means comprises first and second mirrors positioned in a respective one of said two beams for reflecting incident radiation, one of said first and second mirrors being stationary and the other of said mirrors being adapted to be moved controllably along the path of incident radiation, the relative phase of said two beams being thereby controlled.

6. The apparatus defined by claim 5 wherein said first, second and third polarizers are linear polarizers, said polarizers being adapted to be adjusted to polarize at any angle light projected therethrough, said interferometer being a Michelson interferometer.

7. The apparatus defined by Claim 5 wherein said first and second polarizers are circular polarizers and said third polarizer is a linear polarizer, said first and second polarizers being changeable to together form selected combinations of right and left circular polarizers, said interferometer being a Michelson interferometer.

* * * * *